March 27, 1962  R. M. EISENBERG  3,026,632
AUTOMATIC PILOT EJECTION SYSTEM SIMULATOR
Filed Aug. 20, 1958
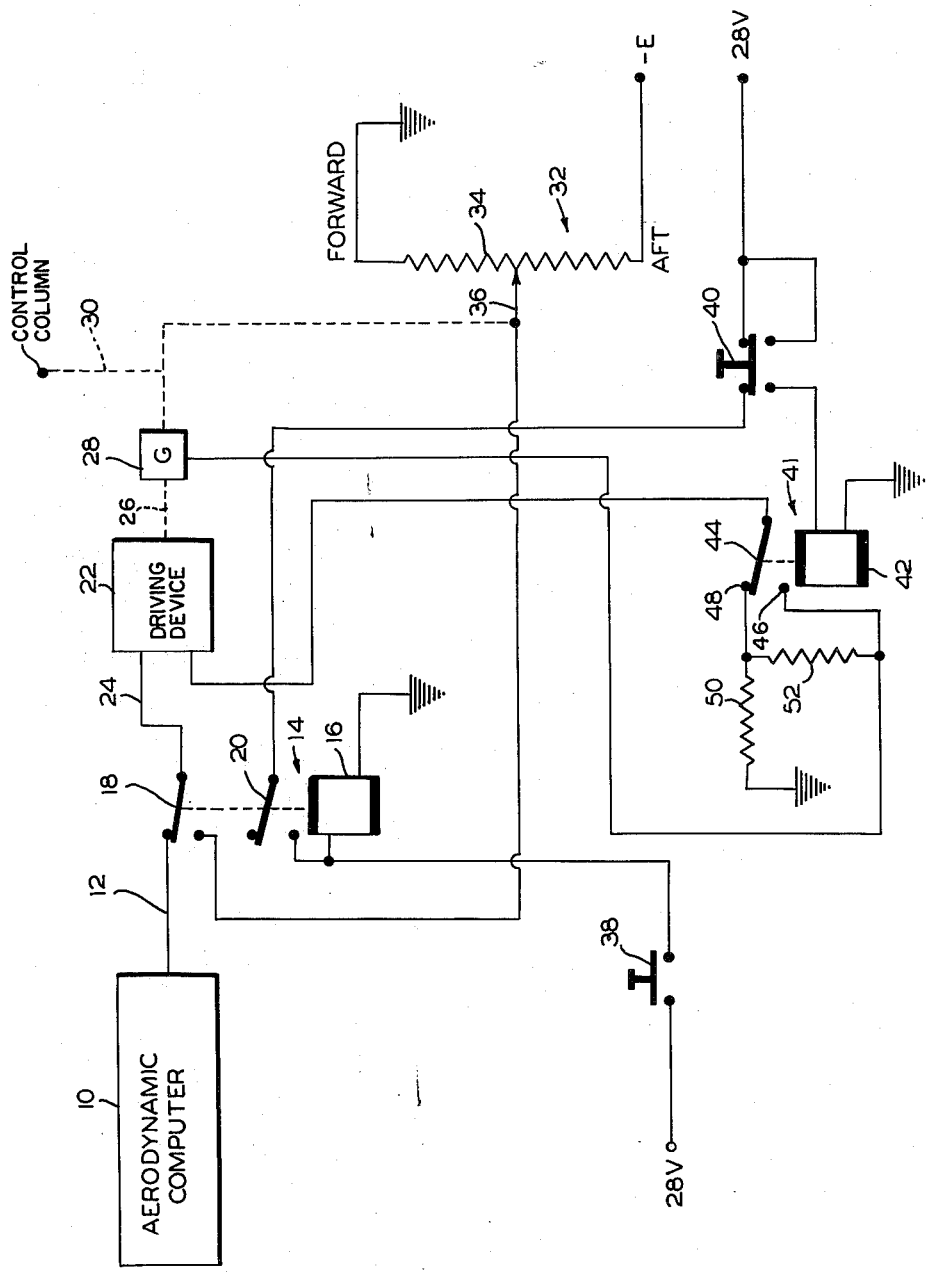
INVENTOR.
ROBERT M. EISENBERG
BY
Donald P. Smith
ATTORNEY

United States Patent Office 3,026,632
Patented Mar. 27, 1962

3,026,632
AUTOMATIC PILOT EJECTION SYSTEM SIMULATOR
Robert M. Eisenberg, Rockville, Md., assignor to ACF Industries, Incorporated, New York, N.Y., a corporation of New Jersey
Filed Aug. 20, 1958, Ser. No. 756,183
6 Claims. (Cl. 35—12)

This invention relates to a grounded aircraft trainer and, more particularly, to a circuit for use in a trainer which realistically simulates one phase of a pilot ejection cycle.

When an actual aircraft has a serious mechanical failure or is badly damaged and the pilot wishes to abandon it, an automatic ejection system is used which is gas operated so that it does not have to depend upon the power of the aircraft, which may not be available. The usual system provides an arrangement whereby the pilot pulls a lanyard which explodes cartridges to remove the canopy over his head and also ruptures a link in the control system and forces the control column forward into the instrument panel out of the way of the pilot's body just prior to the seat ejection, this being necessary because if the pilot forgot to thrust the control column into the full forward position it would be in interfering relation with his body and he could be severely injured if he struck against the enlarged portions of the column as his body was being ejected from the aircraft with the seat. As will be later more fully explained, this invention provides a control device and circuit in an aircraft trainer which snatches the control column from the trainee's hand and moves it into the full forward position out of interfering relationship with his body. Since the trainer is not expendable but must be repeatedly used, the control column must stop short of the instrument panel so that it will not damage the instruments; and provision is made to return the column to its normal position for another flight training cycle.

It is accordingly a broad object of this invention to provide in an aircraft trainer a circuit and actuator to remove the simulated control column from interfering relationship with a trainee's body upon actuation of a simulated ejection switch by the trainee.

It is a further object of this invention to provide, in a simulated pilot ejection system, a device to derive voltages proportional to the displacement of the control column from a full forward position, which voltages are usable to drive the control column into pilot ejection condition.

It is a further and more distinct object of this invention to provide in an aircraft trainer a circuit and actuator to remove a simulated control column away from a trainee's body at high velocity and a further circuit to return the column to operative position at a lower velocity.

It is another object of this invention to improve on the aircraft trainers now in use.

The above objects and advantages will become apparent upon consideration of the following detailed description of a specific embodiment of the invention, especially when taken with the accompanying drawings, hereby made a part thereof, wherein:

The single FIGURE is a detailed schematic wiring diagram embodying the control column motion unit.

In summary, the invention consists of a system for simulating one phase of a pilot ejection system by forceably removing the control column from the trainee's grasp and from interfering relationship with his body; and consists of a driving means having a circuit to derive a voltage corresponding in magnitude to the displacement of the control column from a reference position, which may be defined as full forward position, and a further circuit to connect such derived voltage to the driving means and simultaneously disconnect the normal computer inputs thereto whereby the column is forceably moved away from the trainee. Since this is a simulator, and the system is not expendable but must be reused frequently, another circuit is provided to return the control column to its former position; but damping means are included to give relatively gentle and slow motion return of the column toward the seat to avoid injury to the trainee in the event that he is in the path of motion of the control column.

Reference is here made to the application of Donald S. Peck et al., Ser. No. 728,596, filed April 15, 1958 and assigned to the assignee of the present invention, which is herein incorporated by reference, and wherein is discolsed a simplified schematic wiring diagram of a complete aircraft trainer. In FIG. 1 of the above-mentioned application is shown the inter-relation between the aerodynamic computer and the control column which is available for manipulation by the trainee, and there is illustrated the forces which are computed and transmitted to the control column which tend to resist the trainee's control column deflection by representing the forces exerted by motion of the aircraft through the air and the reaction of the slip stream against the control sufraces. If the control column is not grasped and held by the trainee, these computed forces will move the collmn to a position corresponding to the control surface position as is done in the actual aircraft.

Referring now to the drawing, reference character 10 indicates the aerodynamic computer of FIG. 1 of the above-referenced patent application which is connected by conductor 12 to a contact of a relay designated generally by 14. Relay 14 has operating coil 16 and armatures 18 and 20 bridging between contact pairs in the usual way. A driving device 22, which may be a reversible motor or may be a magnetic clutch of the type illustrated and described in FIG. 4 of the patent application of Charles L. Cohen, Ser. No. 694,376 filed Nov. 4, 1957 and assigned to the assignee of the present invention, the disclosure of which is incorporated herein, is connected to armature 18 by conductor 24. The output shaft of driving device 22, designated by reference character 26, has a generator 28 mounted for rotation therewith and is mechanically coupled to control column 30 which is manipulated by the pilot during simulated flight. A potentiometer 32 has resistance winding 34 connected between a source of negative voltage and ground and a wiper arm 36 mechanically connected to shaft 26. A manual control 38 which actually consists of a lanyard having a handle within easy reach of the trainee is here shown as a normally open pushbutton connected between a source of voltage and the operating coil of relay 14. An instructor's reset button 40 which will be described in detail hereinafter is connected between a source of voltage and armature 20 of relay 14, and has back contacts connected to the operating coil 42 of a relay 41 which has an armature 44 bridging between stationary contacts 46 and 48 respectively connected to generator 28 and a voltage dropping circuit consisting of resistor 50 connected between contact 48 and ground, and resistor 52 connected between the two contacts 46 and 48 as there shown.

In the condition of the circuit here illustrated the trainee, during normal simulated flight manipulates the control column 30 which derives and transmits voltages to the aerodynamic computer. Simultaneously, the aerodynamic computer, here shown as reference character 10 transmits voltages to driving device 22 which tend to resist motion of column 10 and simulates the aerodynamic forces of flight. If during flight the pilot releases his grasp upon the control column, the voltages from the computer will drive the control column 30 through driving device 22. Motion of the control column 30, further, moves wiper arm 36 to a position on resistance winding 34 corresponding to the forward and aft position thereof and a voltage is derived and picked off by wiper arm 36 in accordance with the corresponding position. The above is the normal condition during simulated flight.

When the trainee wishes to abandon the aircraft upon instructions from the instructor, or if a simulated disabling condition which he cannot correct is revealed to him, then he closes switch 38 by pulling on the lanyard, which operation energizes operating coil 16 of relay 14 thereby shifting armatures 18 and 20 to their lower positions. A holding circuit for operating coil 16 is set up through pushbutton 40 to a source of voltage. This operation disconnects the normal voltages appearing on conductor 12 from driving device 22 and connects the voltage derived from potentiometer 32 to armature 18 which at once causes device 22 to force control column 30 forward toward the instrument panel of the trainer. Sufficient voltage is transmitted to the driving device to forceably remove the control column from the trainee's grasp, or to literally snatch it away. The control column moves forward and is physically restrained by a mechanical stop just short of the instrument panel so that no damage is done to the instruments. As the control column moves forward the wiper arm 36 is moved toward the grounded end of resistance winding 34 so that in its final position adjacent the instrument panel no effective voltage is available to further drive it and it remains there. Generator 28 is rotated by shaft 26 as the control column moves to its forward position but the path of energy to device 22 is through voltage dropping resistor 52 so that its output has little or no effect upon the input to device 22.

Since the instant invention is not intended to be a one-operation affair, a reset system is provided. This takes the form of a pushbutton 40 available to the instructor. When the instructor pushes button 40 thereby closing its back contacts, energizing coil 42 of relay 41 receives voltage and armature 44 engages against contact 46. Opening the front contact of button 40 breaks the holding coil for relay 14 and armatures 18 and 20 are spring urged into their normal position whereby the voltages from the aerodynamic computer are again connected to the driving device 22. These voltages, tend to return the control column 30 to its former position. Control button 40 is spring urged into its upper position as there shown and when the instructor wishes to reset the system he must physically hold it against the back contacts. When armature 44 engages contact 48 the out of phase damping voltage from generator 28 is fed to motor 22 through divider network 50 and 52. When the armature 44 engages contact 46, during reset operation, the full out of phase generator voltage is applied to the motor 22 thereby causing the motor to run at a reduced speed so as to allow the control column 30 to slowly return to its former position. The motion then of control column 30 into its former flight position is much slower than the motion toward the instrument panel. This is necessary because if the trainee has assumed the proper position for flight ejection his head is forward, and if the control column were moved back rapidly he could be injured thereby, depending upon the magnitude of the voltages from computer 10.

Thus, a completely safe and realistic system is provided which enables an instructor to observe the response and reactions of a trainee to an emergency condition and gives a most realistic environment to simulated flight without necessarily endangering an actual airplane.

Having described a preferred embodiment of the present invention, it is to be understood that although specific terms and examples are employed, they are used in a generic and descriptive sense and not for the purposes of limitation; the scope of the invention being set forth in the following claims:

What is claimed is:

1. In a grounded aircraft trainer of the type having a computer for deriving voltages representing simulated aerodynamic forces to a control column, a system to simulate one phase of a pilot ejection system by removing the control column from interfering relationship with a trainee's body to an extreme non-interfering reference position, comprising reversible driving means normally connected to the computer to drive the control column to simulate aerodynamic forces acting thereon, a potentiometer having a wiper arm connected to be driven by said last named means to derive a voltage proportional to the displacement of the column from the reference position, a circuit including switch means under the control of the trainee to disconnect the computer from the driving means and connect the potentiometer thereto to thereby rapidly move the control column away from the trainee and to the reference position, manually operable means under the control of an instructor for reversing the driving means to reset the control column to an operative position in readiness for another cycle, said resetting means including a generator coupled to and driven from the driving means and a circuit adapted to connect the output of the generator to the driving means.

2. In a grounded aircraft trainer of the type having a computer for deriving voltages representing simulated aerodynamic forces, a system to simulate one phase of a pilot ejection system by removing the control column from interfering relationship with a trainee's body to an extreme reference position, comprising in combination drive means normally connected to the computer and control column for applying forces to the control column to thereby simulate aerodynamic forces transmitted thereto, second means connected to the control column for producing voltages proportional to the displacement of the control column from the reference position, and circuit means including switch means under the control of the trainee to disconnect the first recited means from the computer and connect the same to the second recited means for moving the control column away from the trainee and into the reference position.

3. The invention as set forth in claim 2 including manually operable means under the control of an instructor to reconnect the said first recited means to the computer and disconnect the said second recited means from said first means to return the control column into operative position.

4. The invention as set forth in claim 3 including voltage reducing means in said circuit means connected for maintaining the velocity of motion of said control column in the direction away from the reference position less than the velocity toward the reference position.

5. In a grounded aircraft trainer of the type having a computer for deriving and transmitting voltages representing simulated aerodynamic forces to a control column, a system to simulate one phase of a pilot ejection system by removing the control column from interfering relationship with the trainee's body, comprising in combination control column driving means connected to the computer, a potentiometer connected to and driven by said driving means for deriving a voltage corresponding inversely in magnitude to the displacement of the column away from the trainee, and a circuit interconnecting said potentiometer with said driving means and including a relay for disconnecting the computer from the driving means and connecting the potentiometer thereto to thereby move the control column away from the trainee, said driving means being responsive to said potentiometer voltage to move the control column with a force which is maximum initially and decreases as the control column moves to its extreme position away from the trainee.

6. The invention as set forth in claim 5 wherein said circuit includes a manual switch under the control of the trainee to initiate operation of the said relay.

References Cited in the file of this patent

UNITED STATES PATENTS

| 2,808,659 | Dehmel | Oct. 8, 1957 |
| 2,909,852 | Stern et al. | Oct. 27, 1959 |